United States Patent [19]

Kudoh et al.

[11] Patent Number: 5,187,650
[45] Date of Patent: Feb. 16, 1993

[54] SOLID ELECTROLYTIC CAPACITORS AND METHOD FOR MANUFACTURING THE SAME

[75] Inventors: Yasuo Kudoh, Yokohama; Masao Fukuyama, Kawasaki; Toshikuni Kojima, Zama; Norishige Nanai, Atsugi, all of Japan

[73] Assignee: Matsushita Electric Industrial Co., Ltd., Osaka, Japan

[21] Appl. No.: 868,362

[22] Filed: Apr. 14, 1992

[30] Foreign Application Priority Data

Apr. 15, 1991 [JP] Japan .................................. 3-082296
Apr. 15, 1991 [JP] Japan .................................. 3-082297

[51] Int. Cl.$^5$ .............................................. H01G 9/04
[52] U.S. Cl. ............................................. 361/525; 29/3
[58] Field of Search ............................... 361/523–530; 29/25.03; 252/62.2

[56] References Cited

U.S. PATENT DOCUMENTS

| | | | |
|---|---|---|---|
| 4,609,971 | 9/1986 | Shaffer | 361/525 |
| 4,785,380 | 11/1988 | Harakawa et al. | 361/525 |
| 4,929,316 | 5/1990 | Harakawa et al. | 204/56.1 |
| 4,943,892 | 7/1990 | Tsuchiya et al. | 361/525 |
| 5,071,521 | 12/1991 | Kojima et al. | 205/153 |

FOREIGN PATENT DOCUMENTS

| | | |
|---|---|---|
| 0295676 | 12/1988 | European Pat. Off. |
| 0336299 | 10/1989 | European Pat. Off. |
| 60-37114 | 2/1985 | Japan |
| 60-244017 | 12/1985 | Japan |

Primary Examiner—Donald A. Griffin
Attorney, Agent, or Firm—Lowe, Price, LeBlanc & Becker

[57] ABSTRACT

Solid electrolytic capacitors comprise a valve metal member having a dielectric oxide film and a conductive underlying layer formed on the member in this order, and a conductive polymer film formed on the layer. The conductive polymer film is formed by electrolytic polymerization of a polymerizable monomer contained in a system containing the monomer and a support electrolyte consisting of a compound having at least one nitro group. By this, high temperature stability of the capacitor is significantly improved. Alternatively, the electrolytic polymerization may be effected in a system which comprises a monomer, a support electrolyte and a phenol or phenoxide derivative having at least one nitro group. Methods for fabricating such capacitors are also described.

20 Claims, 1 Drawing Sheet

SOLID ELECTROLYTIC CAPACITORS AND METHOD FOR MANUFACTURING THE SAME

BACKGROUND OF THE INVENTION

1. Field of the Invention

This invention relates to solid electrolytic capacitors of the type which make use of conductive polymers as a solid electrolyte and which have good frequency characteristics and high reliability under high temperature conditions. The invention also relates to a method for manufacturing the capacitors of the type mentioned above.

2. Description of the Prior Art

Recent trends toward digitalization in the electric and electronic fields have demanded capacitors which are small in size and large in capacitance with a low impedance in a high frequency range.

Known capacitors which have been used in high frequency ranges include, for example, plastic film capacitors, mica capacitors, layer-built ceramic capacitors and the like. These capacitors are disadvantageously so large in size that a large capacitance is difficult to obtain.

On the other hand, a certain type of electrolytic capacitor is known as having a large capacitance. This type of capacitor includes, for example, an aluminum dry electrolytic capacitor and an aluminum or tantalum solid electrolytic capacitor. These electrolytic capacitors are advantageous in that since an anodized film serving as a dielectric layer can be formed very thinly, a large capacitance can be realized. However, the anodized film is liable to undergo damages, so that it becomes necessary to provide an electrolyte between the anodized film and a cathode in order to repair the damages.

With aluminum dry electrolytic capacitors, anode and cathode aluminum foils which have been, respectively, etched, are convolutely wound through a separator and a liquid electrolyte is impregnated in the separator. This presents the problems that since the liquid electrolyte is ion conductive in nature with a large specific resistance, so that the loss (tan $\delta$) becomes great with very poor frequency and temperature characteristics. In addition, the leakage and evaporation of the liquid electrolyte inevitably occurs, thus leading to a decrease of the capacitance and an increase of the loss with time.

With the tantalum solid electrolytic capacitor, manganese dioxide is used as the electrolyte. Accordingly, the problems on the temperature characteristic and the changes of the capacitance and loss in relation to the time can be overcome. However, the relatively high specific resistance of manganese dioxide results in the loss and a frequency characteristic of impedance poorer than those of the layer-built ceramic capacitors and film capacitors.

In order to solve the above problems, there have been recently proposed solid electrolytic capacitors wherein highly conductive polymers, which contain an anion of a support electrolyte as a dopant and which are obtained by electrolytically polymerizing heterocyclic monomers such as pyrrole, thiophene and the like, are formed on an anode through a conductive underlying layer (Japanese Kokai Patent Application NOs. 60-37114 and 60-244017). The solid electrolytic capacitor has good frequency and temperature characteristics.

However, in the known solid electrolytic capacitors which make use of the conductive polymer as the electrolyte, the dopant used is, for example, $BF_4^-$, $ClO_4^-$, $PF_5^-$, $AsF_5^-$, ammonium borodisalicylate or the like. At high temperatures, these dopants are liable to be de-doped or part of the polymer structure is oxidized, so that the length of the conjugated bonds is reduced. This results in a lowering of the electric conductivity. This undesirably leads to a lowering of the capacitance and an increase of the loss (tan $\delta$). In addition, not only electric characteristics, but also mechanical strength and adhesiveness of the conductive polymer layer are degraded when the solid electrolytic capacitor is placed under high temperature conditions over a long term

SUMMARY OF THE INVENTION

It is therefore an object of the invention to provide an improved solid electrolytic capacitor having a conductive polymer film whose electric conductivity is unlikely to degrade under high temperature conditions.

It is another object of the invention to provide an improved solid electrolytic capacitor which is reliably worked under high temperature and high humidity conditions.

It is a further object of the invention to provide a method for fabricating solid electrolytic capacitors of the type mentioned above.

According to one embodiment of the invention, there is provided a solid electrolytic capacitor which comprises a valve metal member having a dielectric oxide film and a conductive underlying layer formed thereon in this order, and a conductive polymer film which is formed on the conductive underlying layer and is obtained by electrolytic polymerization of a polymerizable monomer. The electrolytic polymerization is effected in an electrolytic polymerization system which comprises, in a liquid medium, the polymerizable monomer and a support electrolyte which consists essentially of a compound having at least one nitro group. Preferably, the compound should have a nitro group and at least one sulfo group or at least one carboxyl group.

According to another embodiment of the invention, there is provided a method for fabricating the solid electrolytic capacitor of the type mentioned above which comprises providing a valve metal member having a dielectric oxide film and a conductive underlying layer formed thereon, and subjecting the valve metal member to electrolytic polymerization of a polymerizable monomer in an electrolytic polymerization system which comprises, in a liquid medium, the polymerizable monomer and a support electrolyte consisting essentially of a compound having at least one nitro group, thereby forming a conductive polymer film on the conductive underlying layer.

According to a further embodiment of the invention, there is also provided a solid electrolytic capacitor which comprises a valve metal member having a dielectric oxide film and a conductive underlying layer formed thereon in this order, and a conductive polymer film which is formed on the conductive underlying layer and is obtained by electrolytic polymerization of a polymerizable monomer. The electrolytic polymerization is effected in an electrolytic polymerization system which comprises, in a liquid medium, the polymerizable monomer, a support electrolyte, and a compound selected from phenol derivatives and phenoxide derivatives having at least one nitro group, thereby forming the conductive polymer film comprising the compound.

In this embodiment, the support electrolyte should preferably be naphthalenesulfonates having an alkyl substituent or alkyl phosphates.

According to a still further embodiment of the invention, there is provided a method for fabricating the solid electrolytic capacitor set out in the further embodiment, which method comprising providing a valve metal member having a dielectric oxide film and a conductive underlying layer formed thereon, and subjecting the valve metal member to electrolytic polymerization of a polymerizable monomer in an system which comprises the polymerizable monomer, a support electrolyte and a compound selected from phenol derivatives and phenoxide derivatives having at least one nitro group, thereby forming, on the conductive underlying layer, a conductive polymer film comprising the compound.

BRIEF DESCRIPTION OF THE DRAWING

The sole FIGURE is a schematic sectional view of a solid electrolytic capacitor according to the invention.

DETAILED DESCRIPTION AND EMBODIMENTS OF THE INVENTION

Figure 1:
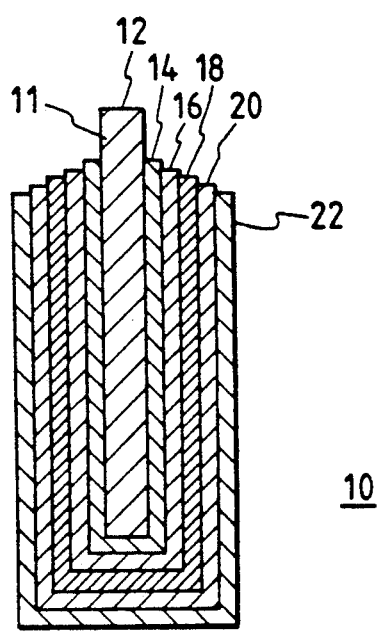

Reference is now made to the accompanying drawing wherein a solid electrolytic capacitor according to the invention is illustrated.

In the figure, there is shown a capacitor unit 10. The unit 10 includes a valve metal member 12 having a dielectric film 14 and a conductive underlying layer 16 formed over the entire surface of the valve metal member 12 except for a terminal 11 for anode. A conductive polymer film 18 is formed on the layer 16. Usually, a carbon layer 20 and a silver paste layer 22 are formed on the conductive polymer film 18 although not essentially required. A lead for the anode and a lead for the cathode (both leads not shown) may be, respectively, attached to the valve metal member 12 and the conductive polymer layer 18 through the silver paste layer 22, and the capacitor unit 10 may be encased in a resin casing to complete a solid electrolytic capacitor.

The common constituent materials used to form the solid electrolytic capacitors according to the respective embodiments of the invention are first described.

The valve metal member is used in the form of a foil or a sheet as usual. Preferably, the foil or sheet is etched in order to increase the surface area of the foil or sheet. The valve metal may be tantalum or aluminum. The dielectric film is formed by anodization as is well known in the art and is specifically described in examples. The conductive underlying layer 16 may be made of materials which can be formed as a thin film and have an electric conductivity to such an extent that the electrolytically polymerized film can grow on the thin film. Preferably, the layer 16 is made of manganese dioxide which is formed by thermal decomposition of organic or inorganic manganese compounds, such as manganese nitrate, manganese acetate, manganese octylate, manganese naphthenate, manganese acetylacetone and the like.

The valve metal 12 on which the dielectric oxide film 14 and the conductive underlying layer 16 have been formed in this order is further formed with the conductive polymer film 18. The conductive polymer film 18 is formed by electrolytic polymerization of a monomer contained in an electrolytic polymerization system.

The monomers should be polymerizable and soluble in water and have an electric conductivity of not less than about $10^{-1}$ S/cm. Examples of such monomers include pyrrole or its derivatives having an alkyl substituent at the 3 and/or 4 or N position thereof, e.g. N-methylpyrrole although thiophene or furan may be used in the practice of the invention. The alkyl substituent should preferably have from 1 to 6 carbon atoms and include, for example, a methyl group, an ethyl group, a propyl group, a butyl group, a pentyl group and a hexyl group. If the electric conductivity is at a satisfactory level, substituents other than the alkyl group may be used. The monomers may be used singly or in combination.

In accordance with a first embodiment of the invention, the conductive polymer film is formed by electrolytic polymerization of the polymerizable monomer in an electrolytic polymerization system which comprises, in a liquid medium, the monomer and a support electrolyte which consists essentially of a compound having at least one nitro group. The compound should preferably have, aside from the nitro group, at least one sulfo group or carboxyl group and include, for example, arylnitrosulfonic acids or salts thereof wherein the nitro group and the sulfo group are joined to the aromatic ring of the acid or salts, or arylnitrocarboxylic acids or salts thereof where the nitro group and the carboxyl group are joined to the aromatic ring. Specific examples of the compounds include nitrobenzenesulfonic acid, dinitrobenzenesulfonic acid, trinitrobenzenesulfonic acid, nitrobenzoic acid, dinitrobenzoic acid, trinitrobenzoic acid and the like, and salts of these acids such as sodium, potassium, lithium, calcium, ammonium and quaternary ammonium salts. These compounds may be used singly or in combination. In addition, those compounds having a naphthalene ring or an anthraquinone ring to which the nitro group or groups and the sulfo or carboxyl group are joined may also be used. As a matter of course, these aromatic rings may have an additional substituent such as an alkyl group.

The medium for the electrolytic polymerization may be one which is able to dissolve the monomer and the support electrolyte having at least one nitro group but is incapable of substantially dissolving the dielectric oxide film. In general, water is used. Besides, organic solvents such as acetonitrile, propylene carbonate and the like may be used as the medium provided that the oxide film on the value metal is not impeded and is capable of yielding an electric conductance sufficient for the electrolytic polymerization. Preferably, an aqueous system is used.

The monomer and the electrolyte having at least one nitro group are, respectively, used at concentrations of from 0.01 to 1 mol/liter and from 0.01 to 0.5 moles/liter.

The polymerizable monomer is electrolytically polymerized in the polymerization system containing the monomer and the support electrolyte. The resultant conductive polymer film is higher in electric conductivity and is less degraded under high temperature conditions than films obtained from systems which are free of any nitro group-bearing compound. The reason for this is not clearly understood and it is assumed that the nitro group of the compound used as the support electrolyte acts to produce polypyrrole of the type in which pyrrole molecules are regularly bonded at the 2 and 5 positions. By this, the relatively active 2 and 5 positions of the pyrrole are believed to be masked, so that the oxidation at the sites or positions under high temperature conditions are suppressed.

Fabrication of the solid electrolytic capacitor unit 10 according to another embodiment of the invention is described.

The valve metal member 12 with or without an anode lead 20 is first provided. This member 12 subjected to etching by any known procedure to increase the surface area. The etched foil is subsequently anodized by immersion in an acid solution to form the dielectric oxide film 14 on the surface of the member 12. The anodization is effected by an ordinary electrochemical procedure. The acid used for this purpose may be an organic acid such as phosphoric acid or an organic acid such as oxalic acid, adipic acid or the like. If the valve metal is aluminum, $Al_2O_3$ is formed on the foil surface. Alternatively, if tantalum is used, $Ta_2O_5$ is formed as the oxide film 14. The member 12 on which the anodized film 14 has been formed is immersed in an aqueous solution of, for example, a water-soluble manganese compound for a given time and dried in air at 200 to 400° C. thereby thermally decomposing the compound into manganese dioxide to form a manganese dioxide underlying layer 16 on the anodized film 14.

The conductive polymer film 18 is then formed on the conductive underlying layer 16. More particularly, the valve metal member 12 is immersed in an electrolytic polymerization system which comprises a polymerizable monomer and a support electrolyte consisting of a compound having at least one nitro group as defined in the first embodiment. A potential sufficient to cause the electrolytic polymerization is applied between a first electrode for the polymerization which contacts the conductive underlying layer 16 and a counter electrode kept away from the first electrode. As a result, a conductive polymer film is formed on the first electrode, from which the conductive polymer film gradually grows toward the conductive underlying layer made, for example, of manganese dioxide. Finally, the conductive underlying layer 16 is fully covered with the conductive polymer film 18 to a level at which the valve metal member 12 has been immersed.

After the conductive polymer film 18 has fully covered the surface of the underlying layer 16 immersed in the system, the polymerization is stopped, followed by washing the polymer film 18 with water to remove an unreacted monomer, the electrolyte and unstable oligomers. For the washing, a solvent which is easy to dry is used including, for example, water, alcohols, acetonitrile, ketones or the like.

A carbon layer and a silver paste layer may be formed on the conductive polymer film, after which a cathode lead (not shown) for the capacitor is attached to the conductive polymer film through the carbon layer and the silver paste layer. Similarly, a lead for the anode may be attached to the valve metal member at this stage to complete the capacitor unit 10. The resultant capacitor unit 10 may be covered with a resin such as an epoxy resin. Finally, the covered element is aged, for example, by application of an appropriate potential at a normal temperature for several hours.

A further embodiment of the invention is described in which the electrolytic polymerization of a polymerizable monomer such as pyrrole or its derivative is effected in a polymerization system which comprises a polymerizable monomer, a support electrolyte and a phenol or phenoxide derivative having at least one nitro group. The other structure of the solid electrolytic capacitor is similar to those set forth in connection with the first and second embodiments. Accordingly, the conductive polymer film 18 obtained according to this embodiment is described.

Although the support electrolyte used in this system may be one, which are ordinarily used for this purpose, such as perchlorates, sulfonates, carboxylats and phosphates, it is preferred to use naphthalenesulfonates having an alkyl substituent having from 1 to 12 carbon atoms or alkyl phosphates having from 2 to 12 carbon atoms. More particularly, there are mentioned sodium monomethylnaphthalenesulfonate, sodium triisopropylnaphthalenesulfonate, sodium monoisobutylnaphthalenesulfonate, sodium dibutylnaphthalenesulfonate, propyl phosphate, butyl phosphate, hexyl phosphate and the like. These electrolytes may be used singly or in combination.

The phenol or phenoxide derivatives having at least one nitro group are not limitative with respect to the number and position of the nitro groups, and the presence or absence and type of other substituent. With the phenol derivative, the number and position of the hydroxyl groups are not limitative. Phenols include not only monohydric phenol, but also polyhydric phenols such as bisphenol, naphthol, binaphthol, anthrol, anthrahydroquinone and the like. Phenoxides are intended to mean salts of the above-defined phenols such as salts of metals such as sodium, potassium, calcium, barium, aluminum and the like and ammonium salts. Specific examples of the phenol and phenoxide derivatives include nitrophenol, dinitrophenol, trinitrophenol, nitrocatechol, nitrohydroquinone, nitropyrogallol, nitrocresol, nitronaphthol, dinitronaphthol, nitrobinaphthol, nitroanthrol, nitroanthahydroquinone, sodium nitrophenoxide, potassium nitrophenoxide, sodium nitronapthoxide, sodium nitroanthoxide and the like. Of these, nitrophenol is preferred. These derivatives may be used singly or in combination.

The polymerization system comprises from 0.01 to 1 mole/liter of the monomer, from 0.01 to 0.5 moles/liter of the support electrolyte and from 0.001 to 0.5 moles/liter of the phenol or phenoxide derivative.

Since the nitro group-bearing compound is incorporated in the polymerization system, the resultant polymer is believed to have a structure which have regularly boned pyrrole units. By this, the film is reduced in number of sites at which oxidation takes place. In general, when the solid electrolytic capacitor is placed under high temperature conditions over a long term, it suffers degradation of the characteristic properties mainly owing to the action of oxygen on the conductive polymer. Since the polymer film obtained by the electrolytic polymerization according to the invention has a reduced number of such sites at which oxidation takes place, the capacitor becomes stabilized when placed under high temperature conditions over a long term.

The solid electrolytic capacitor of the above embodiment is fabricated by subjecting the valve metal member having a dielectric film and a conductive underlying layer as described with respect to the first and second embodiments, to electrolytic polymerization of a monomer in polymerization system as set out above in the same manner as in the second embodiment except for the system which comprises a support electrolyte and a nitro group-bearing phenol or phenoxide derivative.

In all the embodiments, the thickness of the conductive polymer film is generally in the range of from 5 to 50 micrometers. Moreover, the electrolytic polymerization system may further comprise additives such as de-foamers capable of dissipating bubbles during the course of the polymerization and surface active agent for improving wettability between the anode surface and the polymerization system.

The present invention is more particularly described by way of examples.

EXAMPLE 1

A 4 mm wide×6 mm long aluminum etched foil was provided as a value metal foil and was attached with an anode lead. This foil was placed in a 3% ammonium adipate aqueous solution and anodized at about 70° C. by application of a potential of 50 volts to form a dielectric film thereon. Thereafter, the anodized aluminum film was immersed in a 30% manganese nitrate aqueous solution and heated at 250° C. for 10 minutes to form a thermally decomposed manganese oxide conductive layer to provide an anode. The anode foil was then contacted with an electrode for electrolytic polymerization which was made of a stainless steel covered with polypyrrole and was immersed in an aqueous electrolytic polymerization solution containing 0.2 moles/liter of pyrrole, 0.05 moles/liter of sodium m-nitrobenzenesulfonate, and water. A potential of 3 volts were applied between the electrode for electrolytic polymerization and a counter electrode provided in a spaced relation to the first-mentioned electrode to form a conductive polypyrrole film on the manganese oxide layer.

Thereafter, the electrode for the electrolytic polymerization was removed and the film was washed with water and dried. A colloidal graphite layer and a silver paint layer were applied formed on the polymer film in this order, from which a cathode lead was taken out, and packed in an epoxy resin.

The above procedure was repeated to obtain 10 capacitor elements in total.

The respective capacitor elements were aged at 16.2 volts and subjected to measurements of a capacitance at 120 Hz and a loss at 120 Hz immediately after the aging and after 1000 hours under conditions of 125° C. The average values of the ten measurements are shown in Table 1 appearing hereinafter.

COMPARATIVE EXAMPLE 1

The general procedure of Example 1 was repeated except that there was used sodium benzenesulfonate instead of sodium m-nitrobenzenesulfonate, thereby obtaining 10 capacitors. These capacitors were evaluated in the same manner as in Example 1. The results are shown in the Table 1.

The comparison between the results of Example 1 and Comparative Example 1 reveal that the solid electrolytic capacitor of this example is less degraded than that of the comparative example with respect to the capacitance and the loss when placed under conditions of 125° C. for 1000 hours. This is considered to result from the use of sodium m-nitrobenzenesulfonate.

EXAMPLE 2

The general procedure of Example 1 was repeated except that there was used, instead of sodium m-nitrobenzenesulfonate, sodium 2,4,6-trinitrobenzenesulfonate, thereby obtaining ten capacitors. These capacitors were evaluated in the same manner as in Example 1. The results are shown in Table 1. From the table, it will seen that the capacitance and loss are not so degraded after standing under conditions of 125° C. for 1000 hours.

It will be noted that similar results were also obtained when dinitrobenzenesulfonates were used.

EXAMPLE 3

The general procedure of Example 1 was repeated except that there was used, instead of m-nitrobenzenesulfonate, sodium m-nitrobenzoate, thereby obtaining ten capacitors. These capacitors were evaluated in the same manner as in Example 1. The results are shown in Table 1.

COMPARATIVE EXAMPLE 2

The general procedure of Example 3 was repeated using sodium benzoate instead of sodium m-nitrobenzoate. The resultant capacitors could not be evaluated because they could not stand use.

EXAMPLE 4

The general procedure of Example 1 was repeated except that there was used, instead of pyrrole, a mixture of 0.05 moles/liter of N-methylpyrrole and 0.05 moles/liter of pyrrole, thereby obtaining ten capacitors. These capacitors were evaluated in the same manner as in Example 1. The results are shown in Table 1, revealing that good results are obtained with respect to the capacitance and the loss under high temperature conditions of 125° C.

TABLE 1

|  | Initial Characteristics | | Characteristics After 1000 Hours at 125° C. | |
|---|---|---|---|---|
|  | Capacitance (μF) | tan δ (%) | Capacitance (μF) | tan δ (%) |
| Example 1 | 5.52 | 2.1 | 5.24 | 2.9 |
| Comp. Ex. 1 | 5.74 | 1.9 | 4.95 | 4.5 |
| Example 2 | 5.48 | 2.2 | 5.22 | 2.8 |
| Example 3 | 5.37 | 2.3 | 5.09 | 3.0 |
| Comp. Ex. 2 | — | — | — | — |
| Example 4 | 5.38 | 2.7 | 5.04 | 3.4 |

Although sodium salts are used in the above examples, free acids and their salts such as potassium, lithium, calcium, ammonium and quaternary ammonium salts may be likewise used with similar results. In addition, the compounds used in the examples have the nitro group at the meta position, those compounds having the ortho or para position may be likewise used with similar results. In addition, tantalum may be likewise used instead of aluminum.

EXAMPLE 5

A 10 mm wide×7 mm long aluminium etched foil was provided as a valve metal foil and was attached with an anode lead. This foil was placed in a 3% ammonium adipate aqueous solution and anodized at about 70° C. for 40 minutes by application of a potential of 70 volts to form a dielectric film thereon. Thereafter, the anodized aluminium film was immersed in a 30% manganese nitrate aqueous solution and heated at 300° C. for 30 minutes to form a thermally decomposed manganese oxide conductive layer to provide an anode. The anode foil was immersed in an aqueous electrolytic polymerization solution containing 0.15 moles/liter of nitrophenol, 0.5 moles/liter of pyrrole, 0.1 mole/liter of sodium triisopropylnaphthalenesulfonate and water and contacted with an electrode for electrolytic polymerization. A constant potential of 2.5 volts were applied for 30 minutes between the electrode for electrolytic polymerization and a counter electrode provided in a spaced relation to the electrode to form a conductive polypyrrole film on the manganese oxide layer.

Thereafter, the electrode for the electrolytic polymerization was removed and the film was washed with water and dried. A carbon layer and a silver paint were applied onto the polymer film, thereby obtaining ten solid electrolytic capacitors, without packing with any resin, as shown in the sole figure.

The respective capacitor elements were aged at 20 volts and subjected to measurements of a capacitance at 120 Hz and a loss at 120 Hz immediately after the aging and after 1000 hours under conditions of 105° C. The average values of the ten measurements are shown in Table 2 appearing hereinafter.

COMPARATIVE EXAMPLE 3

The general procedure of Example 5 was repeated except that there was not used nitrophenol, thereby obtaining 10 capacitors. These capacitors were evaluated in the same manner as in Example 5. The results are shown in the Table 2.

The comparison between the results of Example 5 and Comparative Example 3 reveal that the solid electrolytic capacitor of this example is superior in the stability under high temperature conditions than that of the comparative example.

EXAMPLE 6

The general procedure of Example 5 was repeated except that there was used, instead of nitrophenol, dinitrophenol, thereby obtaining ten capacitors. These capacitors were evaluated in the same manner as in Example 5. The results are shown in Table 2.

From the table, it will seen that the capacitor of this example is far superior to in the high temperature stability to that of the comparative example.

EXAMPLE 7

The general procedure of Example 5 was repeated except that there was used, instead of nitrophenol, nitronaphthol, thereby obtaining ten capacitors. These capacitors were aged at 20 volts for 1 hour and evaluated in the same manner as in Example 5. The results are shown in Table 2, revealing that the capacitor of Example 7 is superior in the high temperature stability to that of Comparative Example 3.

EXAMPLE 8

The general procedure of Example 5 was repeated except that there was used, instead of nitrophenol, sodium nitrophenoxide, thereby obtaining ten capacitors. These capacitors were aged at 20 volts for 1 hours and evaluated in the same manner as in Example 5. The results are shown in Table 2, revealing that superior results are obtained with respect to the capacitance and the loss under high temperature conditions of 105° C.

EXAMPLE 9

The general procedure of Example 5 was repeated except that there was used, instead of sodium triisopropylnaphthalenesulfonate, n-butyl phosphate, thereby obtaining ten capacitors. The capacitors were each aged at 20 volts for 1 hour and evaluated in the same manner as in Example 1. The results are shown in Table 2.

COMPARATIVE EXAMPLE 4

The general procedure of Example 9 was repeated without use of nitrophenol, thereby obtain ten capacitors. The capacitors were evaluated in the same manner as in Example 5. The results are shown in Table 2, revealing that the capacitor of Example 9 is far superior in the high temperature stability to that of Comparative Example 4.

EXAMPLE 10

The general procedure of Example 5 was repeated except that the electrolytic solution containing 0.5 moles of pyrrole, 0.1 mole of sodium triisopropylnaphthalenesulfonate, 0.15 moles of nitrophenol and water was replaced by a solution which contained 0.5 moles/liter of thiophene, 0.1 mole/liter of tetrabutylammonium-p-toluenesulfonate, 0.15 moles/liter of nitrophenol and acetonitrile, thereby obtaining ten capacitors. These capacitors were aged at 20 volts for 1 hour and evaluated in the same manner as in Example 5. The results are shown in Table 2.

COMPARATIVE EXAMPLE 5

The general procedure of Example 10 was repeated without use of nitrophenol, thereby obtaining ten capacitors. These capacitors were evaluated in the same manner. The comparison between Example 10 and Comparative Example 5 reveal that the capacitor of the example is far superior in the high temperature stability to that of the comparative example.

TABLE 2

|  | Initial Characteristics | | Characteristics After 1000 Hours at 125° C. | |
| --- | --- | --- | --- | --- |
|  | Capacitance ($\mu$F) | tan $\delta$ (%) | Capacitance ($\mu$F) | tan $\delta$ (%) |
| Example 5 | 5.5 | 1.0 | 5.3 | 1.0 |
| Comp. Ex. 3 | 5.2 | 1.2 | 3.4 | 18.5 |
| Example 6 | 5.7 | 1.1 | 5.5 | 1.2 |
| Example 7 | 5.6 | 1.0 | 5.4 | 1.2 |
| Example 8 | 5.4 | 1.0 | 5.1 | 1.1 |
| Example 9 | 5.6 | 1.1 | 5.5 | 1.1 |
| Comp. Ex. 4 | 5.4 | 1.3 | 2.6 | 17.3 |
| Example 10 | 6.0 | 1.0 | 5.8 | 1.2 |
| Comp. Ex. 5 | 5.2 | 1.2 | 2.3 | 16.1 |

What is claimed is:

1. A solid electrolytic capacitor which comprises a valve metal member having a dielectric oxide film and a conductive underlying layer formed thereon in this order, and a conductive polymer film which is formed on the conductive underlying layer and is obtained by electrolytic polymerization of a polymerizable monomer, the electrolytic polymerization being effected in an electrolytic polymerization system which comprises, in a liquid medium, the polymerizable monomer and a support electrolyte which consists essentially of a compound having at least one nitro group.

2. The solid electrolytic capacitor according to claim 1, wherein said compound has at least one nitro group and at least one sulfo group or at least one carboxyl group.

3. The solid electrolytic capacitor according to claim 2, wherein said compound is a member selected from the group consisting of arylnitrosulfonic acids and salts thereof, and arylnitrocarboxylic acids and salts thereof.

4. The solid electrolytic capacitor according to claim 1, wherein said support electrolyte is used in an amount of from 0.01 to 0.5 moles/liter of the system.

5. The solid electrolytic capacitor according to claim 1, wherein said valve metal member is selected from the group consisting of aluminum and tantalum.

6. The solid electrolytic capacitor according to claim 1, wherein said conductive underlying layer is a manganese oxide layer.

7. The solid electrolytic capacitor according to claim 1, wherein the polymerizable monomer is a member selected from the group consisting of pyrrole, pyrrole, derivatives and mixtures thereof.

8. A method for fabricating the solid electrolytic capacitor which comprises providing a valve metal member having a dielectric oxide film and a conductive underlying layer formed thereon, and subjecting the valve metal member tp electrolytic polymerization of a polymerizable monomer in a system which comprises, in a liquid medium, the polymerizable monomer and a support electrolyte consisting essentially of a compound having at least one nitro group, thereby forming a conductive polymer film on the conductive underlying layer.

9. The method according to claim 8, wherein the liquid medium is water.

10. A solid electrolytic capacitor which comprises a valve metal member having a dielectric oxide film and a conductive underlying layer formed thereon in this order, and a conductive polymer film which is formed on the conductive underlying layer and is obtained by electrolytic polymerization of a polymerizable monomer, the electrolytic polymerization being effected in an electrolytic polymerization system which comprises, in a liquid medium, the polymerizable monomer, a support electrolyte, and a compound selected from group consisting of phenol derivatives and phenoxide derivatives having at least one nitro group, thereby forming the conductive polymer film on the conductive underlaying layer.

11. The solid electrolytic capacitor according to claim 10, wherein the support electrolyte is a member selected from the group consisting of naphthalenesulfonates having an alkyl substituent having from 1 to 12 carbon atoms and alkyl phosphates having from 2 to 12 carbon atoms.

12. The solid electrolytic capacitor according to claim 10, wherein said compound is a phenol derivative.

13. The solid electrolytic capacitor according to claim 12, wherein said phenol derivative is nitrophenol.

14. The solid electrolytic capacitor according to claim 10, wherein said compound is a phenoxide derivative.

15. The solid electrolytic capacitor according to claim 10, wherein said compound is used in an amount of from 0.001 to 0.5 moles/liter of the system.

16. The solid electrolytic capacitor according to claim 10, wherein said valve metal member is selected from the group consisting of aluminium and tantalum.

17. The solid electrolytic capacitor according to claim 10, wherein said conductive underlying layer is a manganese oxide layer.

18. The solid electrolytic capacitor according to claim 10, wherein the polymerizable monomer is a member selected from the group consisting of pyrrole, pyrrole derivatives and mixtures thereof.

19. A method for fabricating the solid electrolytic capacitor which comprises providing a valve metal member having a dielectric oxide film and a conductive underlying layer formed thereon, and subjecting the valve metal member to electrolytic polymerization of a polymerizable monomer in a system which comprises, in a liquid medium, the polymerizable monomer, a support electrolyte and a compound selected from phenol derivatives and phenoxide derivatives having at least one nitro group, thereby forming a conductive polymer film on the conductive underlaying layer.

20. The method according to claim 19, wherein the liquid medium is water.

* * * * *